May 15, 1951 J. M. CAGE 2,553,182

COLOR TELEVISION

Filed Nov. 1, 1946 2 Sheets-Sheet 1

INVENTOR
JOHN M. CAGE
BY
Bartlett, Eyre, Keel & Weymouth
ATTORNEYS

INVENTOR
JOHN M. CAGE
BY
Bartlett, Eyre, Keel & Weymouth
ATTORNEYS

Patented May 15, 1951 2,553,182

UNITED STATES PATENT OFFICE 2,553,182

COLOR TELEVISION

John M. Cage, Montclair, N. J., assignor to Cage Projects, Inc., Union City, N. J., a corporation of New Jersey Application November 1, 1946, Serial No. 707,276

25 Claims. (Cl. 178—5.2)

My present invention relates to cathode ray tubes and the like such as are used in television. More particularly the invention includes a new method and means for receiving video signals and producing television pictures therefrom, and a method and means for transmitting and receiving television pictures in color.

A feature of the invention is the utilization of ultra-violet together with visible light in a receiving tube with subsequent conversion to visible light of any desired color or pure white on a viewing screen. This greatly increases the light generating effect of the electron beam, permits viewing of the screen on the same side as the excitation and increases picture contrast.

Other features of the invention, including the utilization of ultra-violet light for color selectivity in color television, will become apparent as the description proceeds.

When an electron scanning beam bombards luminescent material the efficiency of production of light is low but rapidly increases with the frequency of the generated light. Thus, if only the visible light emitted by a phosphor coated screen when electronically bombarded is utilized, the efficiency of conversion is low, but if both the visible and ultra-violet light can be utilized the efficiency of conversion will be much enhanced. Ultra-violet light when directed against a fluorescent screen in turn generates visible light and hence the generated ultra-violet light together with the visible light from the receiving tube screen may be focused on a viewing screen for production of the television picture. Moreover, there is a definite relation between the wave length of the ultra-violet and the wave length of the generated visible light which may be used advantageously for reproduction of television pictures in color.

Figures 1, 1A, 1B, 2:
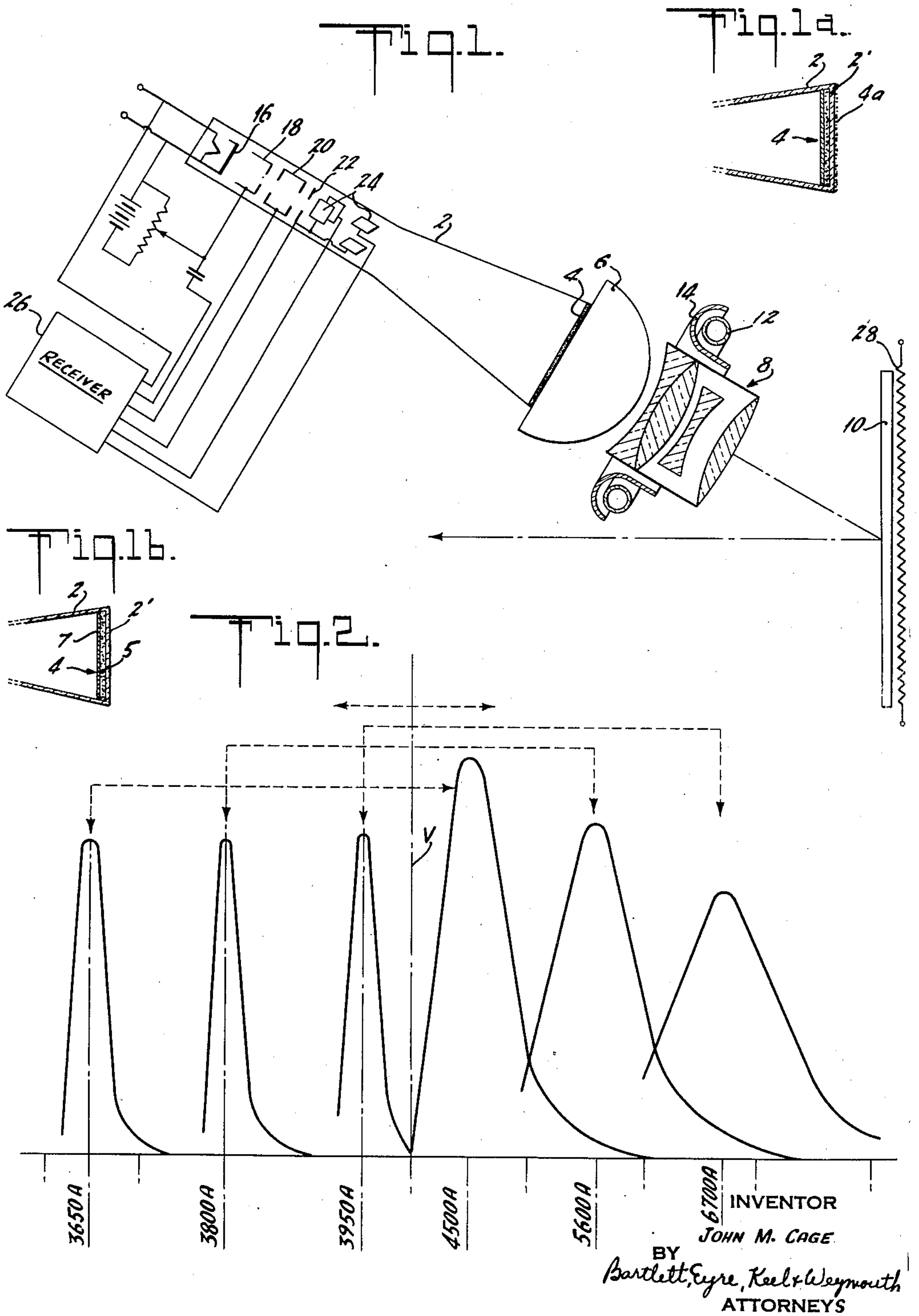
Figure 3:
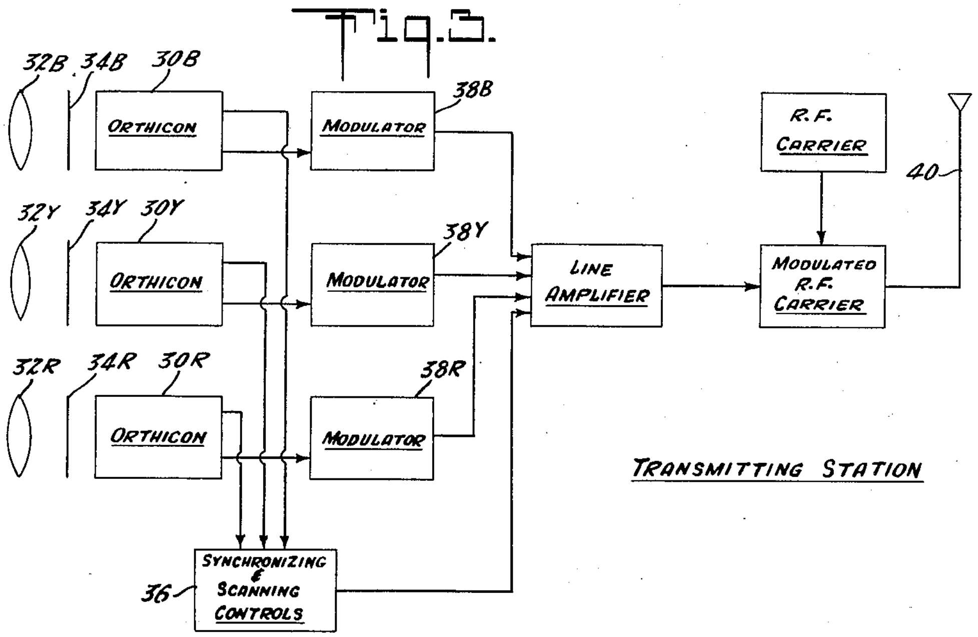
Figure 4:
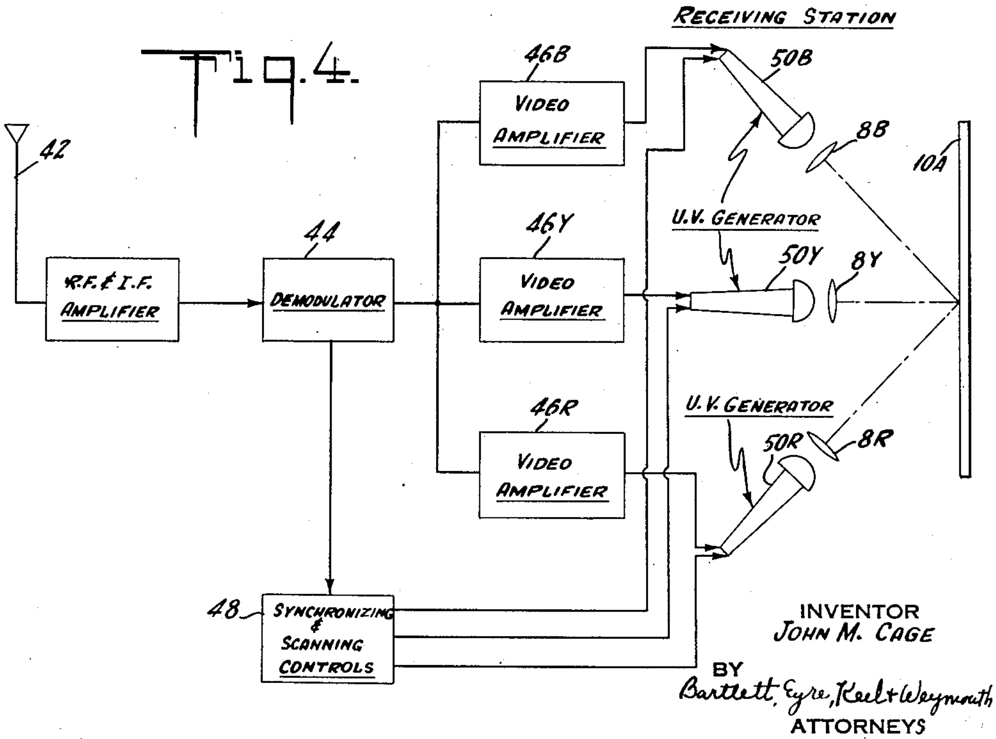

The invention will be more fully described by reference to the accompanying drawings of which:

Fig. 1 is a diagrammatic view of a television receiving tube generating ultra-violet light in accordance with the invention;

Fig. 1*b* is a sectional view, somewhat diagrammatic, of a part of Fig. 1;

Fig. 1*a* illustrates a modification;

Fig. 2 is a diagram explanatory of the relation of the wave length of emitted visible light to that of the exciting ultra-violet radiation; and Figs. 3 and 4 are diagrams illustrating the application of the invention to color television, Fig. 3 being a diagrammatic representation of a color television transmitting station and Fig. 4 that of an associated receiving station.

The new receiving and ultra-violet generating tube is shown in Fig. 1. It comprises an elongated flared envelope 2, in the tubular end of which may be the conventional elements comprising the electron gun. The flared end of the tube carries a screen 4 comprising a coating 5 of a phosphor or of a mixture of phosphors on the tube end wall 2' for generation of ultra-violet light, and a thin layer 7 of metal, such as aluminum or beryllium which lies over the coating and through which penetrates the electron beam. The metal layer part of the screen 4 acts as a reflecting mirror for the generated light. Suitable phosphors may be made by compounding thallium and zinc or cadmium phosphors in correct proportion. Sealed to the flared end of the bulb 2 is a liquid lens 6 containing a cooling fluid, such as a saturated solution of dichlorobenzene or distilled water. A quartz lens 8 is positioned to receive the ultra-violet light generated on the screen 4 by the electron scanning beam and the lens 8 focuses this light upon a viewing screen 10. Screen 10 may be coated with zinc-cadmium sulphide luminescent material such as is now used for the luminous screens in receiving tubes or zinc beryllium silicates or thallium activated salts may be used as the luminescent material. Or the screen 10 may be made of plastic that is transparent to ultra-violet light and which contains luminescent or fluorescent material within it, this material having been suspended in the plastic during the course of manufacture while the plastic was in the liquid state. When a transparent plastic screen is employed the screen may be viewed from the side opposite to the tube 2. Preferably a source 12 of ultra-violet light is provided to throw on the screen 10 just sufficient ultra-violet light to approach the threshold of emission of visible light so that when the light from the screen 4 scans the screen 10 no energy is lost in reaching the threshold of emission. The lens 6 must of course be shielded, as by a shield 14, from the source 12. The tube 2 at least at the flared end thereof must not block the passage of ultra-violet light so should be of quartz or other ultra-violet transmitting material. The glass known as Pyrex is suitable as it passes wave lengths as short as 3000 Angstrom units.

In the above description the elements of the electron gun have not been specifically designated as they are conventional and form no part of the present invention. They include of course a cathode 16, grid 18, anodes 20 and 22, and vertical and horizontal deflecting plates 24, all connected with the usual receiver 26.

To give instantaneous maximum light emission from the screen 10 the screen may be heated as by means of an electric heater diagrammatically indicated at 28.

The multi-phosphor used to coat the screen 4 can be properly compounded to generate ultra-violet light of three different frequencies, each of which will excite light of a definite color on the screen 10. This is schematically indicated in Fig. 2 in which the visible spectrum is shown to the right of the dividing line V and the ultra-violet spectrum (on a larger scale for clarity) is shown on the left.

By reference to Fig. 2 it will be noted that ultra-violet light of about 3650 A. will give peak excitation of 4500 A. or blue light, ultra-violet light of 3800 A. will give peak excitation of 5600 A. or yellow light, and ultra-violet light of 3950 A. will give peak excitation of 6700 A. or red light. Thus when the electron beam scanning the screen 4 generates these three ultra-violet frequencies the visible light emitted from the screen 10 will be a composite of the three primary colors and the pictures will appear in black and white. Or, for black and white pictures, the phosphors selected for the screen 4 may be such that the visible light emitted by the screen 4 when combined with the light generated at the screen 10 by the ulra-violet rays will produce white light. For example, if the screen 4 is coated with willemite (alpha-zinc silicate), it will emit green light when electronically bombarded and it will emit also ultra-violet light of approximately 3650 Angstroms. This green light when combined on the screen 10 with the blue light generated by the ultra-violet light, will yield the picture in white light.

Instead of using a viewing screen as described in connection with Fig. 1, the television picture may be produced directly on the end of the ultra-violet ray generating tube as indicated diagrammatically in Fig. 1*a*. In this embodiment of the invention the lens system including the elements 6 and 8 of Fig. 1 are omitted and a very thin layer 4*a* of phosphor coating is applied to the outer end wall of the tube. With this arrangement the screen 4 which may include a phosphor layer of willemite, for example, generates when bombarded ultra-violet and visible light. The ultra-violet light upon passing through the wall of the envelope irradiates the phosphor coating of the layer 4*a* causing generation of visible light, which light together with the visible light emitted by the screen 4 gives the television image for direct viewing. The phosphor layer 4*a* may be a mixture of zinc sulphide with cadmium sulphide so proportioned as to make the absorption wave length equal to the strongest ultra-violet band of the phosphor used in the screen 4.

The excitation of the primary colors by ultra-violet light of the respective frequencies indicated in Fig. 2 make it practicable to employ the new tube in color television as will now be described in connection with Figs. 3 and 4.

For color television transmission in accordance with the invention and as indicated in Fig. 3, three separate camera tubes 30B, 30Y and 30R are arranged so that the object to be televised forms an image on the screen of each tube. These tubes may be the standard type Orthicon tubes and hence are indicated only diagrammatically in the drawing. Between the lens 32B and tube 30B is a filter 34B which passes only blue light so that the image formed on the screen of tube 30B will correspond to only so much of the object as emits blue light. Similarly a filter 34Y passing only yellow light is positioned between lens 32Y and tube 30Y and a filter 34R passing only red light is positioned between lens 32R and tube 30R. Thus the video signals generated in the camera tube 30B correspond to the blue portions of the object, those generated by tube 30Y correspond to the yellow portions of the object, and those generated by tube 30R correspond to the red portions of the object. The three camera tubes are operated on a common circuit as indicated diagrammatically by the arrowed lines leading to the conventionally shown synchronizing and scanning controls 36. The video current from each camera tube will have a slightly different amplitude or frequency imposed upon it as by means of modulators 38B, 38Y and 38R so that amplitude or frequency selection of the impulses originating in each camera can be led to respective ultra-violet generating tubes at the receiving station. The three video signals after passing through a suitable line amplifier, together with the synchronizing and scanning control currents, modulate a radio frequency carrier for radiation by antenna 40.

At the receiving station, as shown in Fig. 4, energy received by the receiving antenna 42 after passing through suitable amplifiers, is demodulated at 44, the three differently amplitude or frequency modulated video signals being separated and delivered to the respective video amplifiers 46B, 46Y and 46R and the synchronizing and scanning control currents being separated and delivered to the appropriate equipment conventionally indicated at 48.

The video current from amplifier 46B, corresponding to the blue image, is impressed upon an ultraviolet generator tube 50B. Tube 50B is similar to the tube of Fig. 1 except that the screen thereof will be coated with a phosphor which generates blue light and ultra-violet light of approximately 3650 A. so that the generated ultra-violet light will excite blue light on the luminous screen 10A. Similarly the video current from amplifier 46Y, corresponding to the yellow image, is impressed upon a tube 50Y of which the screen is coated with a phosphor that generates yellow light and ultra-violet light of approximately 3800 A. and the video signal current from amplifier 46R, corresponding to the red image, is impressed upon tube 50R, the screen of which is coated with a phosphor which generates red light and ultra-violet light of approximately 3950 A.

Mixtures of phosphors to produce any desired ultra-violet or visible light are now common knowledge. It is known that the absorption bands of all phosphors are quite narrow but that this absorption band can be shifted from one frequency range to another by the addition of impurities or by mixing two or more phosphors in varying amount. See for example, "Luminescent Material" by H. W. Leverenz and F. Seitz, Journal of Applied Science, vol. 10, July 1939, pp. 479–493. It will be understood therefore that the following examples of suitable phosphor coating are given as illustrative only and not as limiting the invention.

Zinc sulphide provides a suitable phosphor for the screen of tube 50B as it emits a blue haze and ultra-violet light of 3650. Cadmium sulphide is suitable for the screen of tube 50R as it emits a red haze and ultra-violet light of 3950–4000 Angstroms. A mixture of these phosphors, with some calcium oxide added, provides a suitable phosphor for the screen of tube 50Y.

The three beams of visible and ultra-violet light from the tubes 50B, 50Y and 50R have a common focus on the screen 10A. The color impression on the screen 10A will be due to the respective intensity at any moment of each receiving tube. When all tubes are of equal intensity the picture will be received in black and white. When the scanning triple beam corresponds to a blue point of the image, tubes 50Y and 50R are quiescent and the blue generating tube 50B only excites the screen 10A. Similarly, when the area being scanned is a mixture of two colors, the corresponding two tubes will be operating and the spot on the screen 10A will be a true blend of the colors of the corresponding image spot. Thus true color reproduction throughout the visible spectrum is made possible. Of course suitable known means both at the transmitter and receiver will be employed to insure synchronous scanning at the two stations, to insure that the optical paths from image to Orthicon screens at the transmitter are equal and to insure a common focus of the visible and ultra-violet beams on the screen 10A at the receiving station. In the drawing the ultra-violet generating tubes 50B, 50Y and 50R are shown widely spaced for convenience. In practice these tubes would be closely adjacent to minimize adjustment for equality of beam paths.

The above described three color system has numerous advantages over the mechanical type of three color television systems heretofore proposed. One advantage is that in the system of the present invention no time is lost as each camera tube is continuously exposed to the image and each ultra-violet generating tube is constantly ready for energization. In the mechanical system, while the red image is being formed, no other images are being formed. Consequently should there be no red in the image, one-third of the exposure time is completely wasted. Another and an important advantage of the system is that no three separate images have to be "interlaced" as a common focus of the rays from the three receiving tubes insures the complete picture in color.

It will be apparent that another advantage of the present system which is of particular value during transition in the industry from black and white to color television, is that a receiving apparatus equipped only for black and white reception could receive from a transmitting apparatus such as is shown in Fig. 3, in which case of course the picture would appear in black and white, and conversely, a receiving system such as that of Fig. 4 could receive broadcasts from a station transmitting only black and white pictures, in which case also the picture would appear only in black and white.

The invention has now been described both with reference to black and white and to color television. Various changes could be made and various refinements added or subtracted without departing from the spirit of the invention as defined in the appended claims. For example, it has been indicated in Fig. 3 that the camera tubes are Orthicons and that each is provided with a suitable filter to pass only a certain band of the spectrum. Instead of Orthicons I could, and preferably would, employ a new type of generating tube described and claimed in my co-pending application Serial No. 714,854, filed December 7, 1946, and entitled Video Signal Generator Tube, wherein the electronic beam scans a virtual image of the image on the mosaic and thus permits of the employment of higher and more efficient potentials between the photo cathode, mosaic and the anode collector ring. Also, instead of using filters, the mosaics of the camera tubes could be themselves constructed so as to be sensitive only to a selected color, that is, the light sensitive surface in each camera tube could be made of such photoelectric material as to peak at the frequencies desired.

I have set forth and described above certain preferred phosphors which may be used in the invention, but it is understood that certain features of the invention are not limited to any particular phosphor used and that any crystalline dielectrics, whether chemically pure or activated by any impurity, such as a metallic activator or any other activating substance which will cause the crystalline dielectric to absorb energy at one wave length to emit energy at a different wave length, may be used.

I claim:

1. A television receiving apparatus comprising in combination an envelope containing an electron gun for generating an electron beam modulated in intensity by video signals, a phosphor coated, transparent screen in said envelope adapted to emit ultra-violet light when electronically bombarded, means for causing the electron beam to scan said screen, a viewing screen adapted to emit visible light when subjected to ultra-violet radiation, and means for focusing the ultra-violet light emitted from said first mentioned screen on to said viewing screen.

2. A television receiving apparatus comprising an envelope transparent to ultra-violet light, an electron gun in one end of said envelope, a phosphor coated screen in the other end of said envelope adapted to generate ultra-violet light when bombarded with electrons, a liquid lens adjacent said screen, a viewing screen containing material adapted to emit visible light when irradiated with ultra-violet light, and a quartz lens between said liquid lens and said viewing screen for focusing the ultra-violet light generated by said first mentioned screen on to said viewing screen.

3. Television receiving apparatus according to claim 2 wherein said viewing screen is of transparent plastic material containing luminous material in suspension therein.

4. Television receiving apparatus according to claim 2 wherein said first mentioned screen is coated with a phosphor that generates ultra-violet light of approximately a single wave length.

5. Color television receiving apparatus comprising in combination a first, second and third receiving tube each equipped with an electronic gun, common scanning and synchronizing controls for said tubes adapted to cause the electronic beams generated by the guns to scan in unison, a phosphor coated screen in said first tube adapted to generate ultra-violet light of one band of wave lengths when electronically bombarded, a phosphor coated screen in said second tube adapted to generate ultra-violet light of another band of wave lengths when electronically bombarded, a phosphor coated screen in said third tube adapted to generate ultra-violet light in a third band of wave lengths when electronically bombarded, a viewing screen adapted to emit blue light when irradiated with ultra-violet light generated in said first tube, to emit yellow light when irradiated with ultra-violet light generated in said second tube, to emit red light when irradiated with ultra-violet light generated in said third tube, and means for bringing the light generated in said tubes to a common focus on said viewing screen.

6. Receiving apparatus according to claim 5 wherein the phosphor coating of said first tube is zinc sulphide, of said second tube is a mixture of zinc and cadmium sulphides and of calcium oxide, and of said third tube is cadmium sulphide.

7. Color television receiving apparatus comprising in combination a first, second and third receiving tube each equipped with an electronic gun, common scanning and synchronizing controls for said tubes adapted to cause the electronic beams generated by the guns to scan in unison, a screen in said first tube coated with a phosphor adapted to generate blue light and ultra-violet light of substantially 3650 Angstroms when electronically bombarded, a screen in said second tube coated with a phosphor adapted to generate yellow light and ultra-violet light of substantially 3800 Angstroms when electronically bombarded, a screen in said third tube coated with a phosphor adapted to generate red light and ultra-violet light of substantially 3950 Angstroms when electronically bombarded, a luminous viewing screen positioned to be irradiated by the light generated in said tubes, and means for bringing the light generated in said tubes to a common focus on said viewing screen.

8. A cathode ray tube comprising in combination an envelope, cathode ray generating means in one end of said envelope, a screen positioned to be bombarded by rays generated by said means, said screen comprising a coating on an end wall of said envelope of phosphors adapted to emit ultra-violet light under cathode ray bombardment, and a metal layer transparent to cathode rays over said phosphors serving as a reflecting mirror for light generated in said phosphors and means for converting said ultra-violet light to visible light.

9. A cathode ray generating tube comprising in combination an envelope, a screen positioned to be bombarded by cathode rays generated in said envelope, said screen including a phosphor coating on a wall of said envelope and means including a second screen directly responsive to the ultra-violet light produced by the first said screen for converting said ultra-violet light generated by said screen when bombarded by cathode rays to visible light.

10. A cathode ray generating tube for reproducing images comprising in combination an envelope, a screen positioned to be bombarded by cathode rays generated in said envelope, said screen including a phosphor coating on a wall of said envelope and means for utilizing both visible and ultra-violet light generated by said screen when bombarded with cathode rays to increase the brilliance of the reproduced images.

11. A television receiving apparatus comprising in combination an envelope, cathode ray generating means in said envelope, a screen positioned to be bombarded by rays generated by said means, said screen including a phosphor coating on a wall of said envelope and means for modifying ultra-violet light generated by said screen when bombarded by cathode rays to increase the efficiency of said cathode ray tube by projection of the light on a second screen.

12. A television receiving apparatus comprising in combination an envelope, cathode ray generating means in said envelope, a screen positioned to be bombarded by rays generated by said means, said screen including a phosphor coating on a wall of said envelope and means for utilizing both visible and ultra-violet light generated by said screen when bombarded with cathode rays to improve the efficiency of the generating means.

13. An ultra-violet ray generating tube comprising in combination an envelope at least one end wall of which is of such material as to transmit ultra-violet light, means in said envelope for generating an electron beam, a coating on said end wall of said envelope of phosphors adapted to emit ultra-violet light when bombarded by an electron beam, and a metal layer over said coating transparent to an electron beam and serving as a reflecting mirror for light generated in said coating and means for modifying the ultra-violet light.

14. The tube according to claim 13 wherein said coating is of willemite.

15. In a television system including a cathode ray tube, means for utilizing ultra-violet light generated in said cathode ray tube, including an ultra-violet and reflecting means within the tube and lens means for focusing the ultra-violet light reflected by said reflecting means and a luminous screen positioned in the path of the light passing through said lens.

16. In the television system according to claim 15 a source of ultra-violet light for flooding said luminous screen below the threshold value of emission.

17. Image reproducing apparatus comprising a screen and a beam of electrons for bombarding said screen to reproduce an image in light at least part of which is ultra-violet light and a second screen interposed between said first screen and the observer whereby ultra-violet light is converted to visible light to increase the brilliance of the reproduced image.

18. Image reproducing apparatus according to claim 17 wherein said second screen is transparent to visible light.

19. Image reproducing apparatus according to claim 17 wherein a light reflecting layer transparent to electrons is formed on the surface of the first said screen between said screen and the source of electrons.

20. Image reproducing apparatus according to claim 17 wherein an auxiliary source of ultra-violet light shielded from the first said screen is directed on said second screen to pre-excite it and thereby obtain increased picture brilliance.

21. The method of reproducing images comprising forming an image on the screen of a cathode ray tube, focusing said image on a fluorescent screen by means of a projection lens and exciting said fluorescent screen to the threshold of visibility by a source of ultra-violet light projected uniformly over the screen area, said focused image raising the fluorescence of the screen from the threshold of said screen to reproduce a brighter and more distinct image and thus more efficiently utilize the light forming the projected image pattern.

22. The method of reproducing images comprising forming an image on the screen of a cathode ray tube, focusing said image on a fluorescent screen by means of a projection lens and exciting said fluorescent screen to the threshold of visibility by a source of ultra-violet light projected uniformly over the screen area, and heating said fluorescent screen, said focused image raising the fluorescence of the screen from the threshold of said screen to reproduce a brighter and more distinct image and thus more efficiently utilize the light forming the projected image pattern.

23. In the projection of images on a screen, means for increasing the efficiency thereof, comprising the combination of a fluorescent screen, means for focusing said image on the screen and means including a source of ultra-violet light uniformly covering the screen area to excite the screen to the threshold of visibility whereby the brilliance and distinctiveness of the reproduced image are materially improved.

24. In the projection of images on a screen wherein said images are formed at least in part of ultra-violet light, means for more efficiently utilizing the light forming said images comprising the combination of a fluorescent screen, means for focusing said image on the screen and means including a source of ultra-violet light uniformly covering the screen area to excite the screen to the threshold of visibility whereby the brilliance and distinctiveness of the reproduced image are materially improved.

25. In the projection of light patterns on a fluorescent screen, means for increasing the efficiency of the projection of said patterns comprising the combination of a projection lens for focusing said patterns on the screen and ultra-violet light producing means uniformly exciting the screen to the threshold of visibility whereby the focused image is reproduced with increased brilliance.

JOHN M. CAGE.

REFERENCES CITED

The following references are of record in the file of this patent:

UNITED STATES PATENTS

| Number | Name | Date |
|---|---|---|
| Re. 22,734 | Rosenthal | Mar. 19, 1946 |
| 2,029,639 | Schlesinger | Feb. 4, 1936 |
| 2,121,356 | Knoll | June 21, 1938 |
| 2,335,180 | Goldsmith | Nov. 23, 1943 |
| 2,378,746 | Beers | June 19, 1945 |
| 2,395,099 | Cage | Feb. 19, 1946 |
| 2,403,227 | Leverenz | July 2, 1946 |
| 2,415,311 | Szegho | Feb. 4, 1947 |
| 2,423,830 | Fonda | July 15, 1947 |

FOREIGN PATENTS

| Number | Country | Date |
|---|---|---|
| 105,944 | Australia | Nov. 23, 1938 |
| 402,397 | Great Britain | Nov. 27, 1933 |
| 432,225 | Great Britain | July 23, 1935 |
| 490,029 | Great Britain | Aug. 4, 1938 |
| 517,483 | Great Britain | Jan. 31, 1940 |

OTHER REFERENCES

Principles of Television Eng., by Fink, McGraw-Hill Book Publishing Co., New York, N. Y., pages 344 to 352.